Patented Dec. 7, 1937

2,101,323

UNITED STATES PATENT OFFICE 2,101,323

MONOAMIDES OF DICARBOXYLIC ACIDS AND PROCESS OF PREPARING THE SAME

Paul L. Salzberg, Wilmington, Del., assignor to E. I. du Pont de Nemours & Company, Wilmington, Del., a corporation of Delaware No Drawing. Application June 5, 1936, Serial No. 83,811

9 Claims. (Cl. 260—108)

This invention relates to new compounds and new compositions of matter, and more particularly to monoamides of dicarboxylic acids having one of the amido hydrogens replaced by an aliphatic hydrocarbon radical of at least 8 carbon atoms and alkali and alkaline earth metal salts of these amides.

These compounds have the general formula

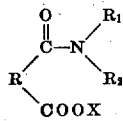

in which X is hydrogen or an alkali or alkaline earth metal, R represents the residue of a dicarboxylic acid, preferably an ortho-aromatic radical of the benzene series, $R_1$ is an aliphatic hydrocarbon radical containing eight or more carbon atoms, and $R_2$ is hydrogen or an organic radical. The invention especially relates to phthalamates of long chain amines, that is, to compounds in which R in the general formula given above represents an ortho-aromatic radical of the benzene series.

It is an object of the invention to produce new and useful compounds of the character described, and new and useful compositions containing such compounds. A further object is to produce new and improved water-resistant, low-vapor pressure plasticizers for cellulose derivatives. Another object is to produce new and useful wetting agents and detergents. Other objects will appear hereinafter.

In accomplishing these objects in accordance with the present invention, it has been found that compounds having the general formula

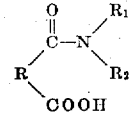

in which R represents the residue of a dicarboxylic acid such as phthalic acid, $R_1$ is an aliphatic hydrocarbon radical containing eight or more carbon atoms, and $R_2$ is hydrogen or an organic radical, may be prepared by reacting long chain primary or secondary aliphatic amines containing at least eight carbon atoms with acid anhydrides such as phthalic anhydride, or by hydrolyzing long chain imides of acids such as phthalic acid and isolating the resulting products. Thus, when long chain primary amines containing at least eight carbon atoms are reacted with phthalic anhydride, the phthalimide may be obtained as an intermediate. This is converted to the phthalamate by hydrolysis, e. g., with an aqueous alkaline solution. Long chain secondary amines containing eight or more carbon atoms react with phthalic anhydride to give the long chain phthalamate directly.

The invention will be further illustrated by the following examples in which the quantities are stated in parts by weight.

Example I

Forty (40) parts of monododecyl amine and 32 parts of phthalic anhydride were heated at 180°–200° C. for one hour forming the intermediate dodecyl phthalimide. This product, without isolation, was treated with a 10% KOH solution for half an hour and the aqueous solution was strongly acidified with hydrochloric acid. The precipitated crude product was crystallized from 50% ethyl alcohol to yield 30 parts of monododecyl phthalamate, melting at 88° C.

Example II

Forty (40) parts of didodecyl amine were heated with 16.8 parts of phthalic anhydride at 220° C. for five hours. The product, dissolved in benzene, was treated with decolorizing carbon and the solvent allowed to evaporate from the filtered solution. Forty-two (42) parts of didodecyl phthalamate, a brown viscous oil, were obtained.

Example III

Fifty (50) parts of mono-octyl amine and 57.5 parts of phthalic anhydride were heated at 150° C. for fifteen minutes. The reaction mixture was recrystallized from 300 parts of ethyl alcohol to yield 80 parts of octyl phthalimide melting at 50°–51° C. Octyl phthalimide was treated with 10% KOH for half an hour and the aqueous solution strongly acidified. The precipitated crude product was crystallized from 50% ethyl alcohol to yield mono-octyl phthalamate.

Example IV

One hundred fifty (150) parts of potassium phthalimide and 120 parts of octyl chloride were heated at 180°–190° C. for twenty-four hours. The reaction mixture was filtered and the excess octyl chloride was removed by vacuum distillation. The residue was recrystallized from ethyl alcohol to yield octyl phthalimide. Octyl phthalimide was treated with 10% KOH for half an hour and the aqueous solution strongly acidified. The precipitated crude product was crystallized from 50% ethyl alcohol to yield mono-octyl phthalamate.

Example V

To 9.8 parts of maleic anhydride dissolved in ether were added 37.2 parts of dodecyl amine dissolved in ether, and the reaction mixture refluxed. The reaction product obtained after recrystallization from alcohol was a white solid melting at 98° C.

Example VI

To 92.5 parts of dodecyl amine were added slowly, with stirring, 74 parts of phthalic anhydride, keeping the temperature under 50° C. The reaction product was dissolved in an excess of sodium hydroxide, the solution acidified, the precipitate filtered and dried. An 81% yield of a product identified as monododecyl phthalamate was obtained.

Example VII

To 59 parts of a mixture of octadecyl and cetyl amines were added 34.4 parts of phthalic anhydride, and the mixture heated with stirring at 60° C. for two and one-half hours. The reaction product, after crystallization from acetone, was a crystalline solid melting at 91°–95° C.

The compounds prepared in the manner described above are white crystalline solids or oily liquids. They are substantially insoluble in water but are soluble to varying degrees in organic solvents.

Instead of the amines used in the examples, other amines may be similarly employed including monoalkyl amines, e. g., nonyl, decyl, undecyl, tetradecyl, cetyl, octadecyl, 9:10-octadecenyl, and eicosyl amines; dialkyl amines, e. g., dioctyl, dinonyl, didecyl, diundecyl, ditetradecyl, dicetyl, di-(9,10-octadecenyl), dioctadecyl amines; mixed dialkyl amines, e. g., methyl octyl, propyl dodecyl, butyl octadecyl and methyl octadecenyl amines. As further examples of secondary amines which may be employed may be mentioned N-dodecyl-aniline, N-dodecyl-glucamine, and N-dodecyl-ethanolamine.

In carrying out the reaction, substituted phthalic anhydrides may be employed as, for example, those containing halogen (e. g., chloro-, fluoro- or bromo-), nitro, or sulfonic acid groups. As further examples of acid anhydrides which may be reacted with amines in accordance with the invention may be mentioned hexahydrophthalic, adipic, succinic, pimelic and itaconic anhydrides. In general, anhydrides of dicarboxylic acids forming inner anhydrides, and especially phthalic anhydride, its analogues and homologues, are preferred.

The proportions of amine and acid anhydride may vary, but generally good results are obtained with approximately equimolecular proportions. However, an excess of either reactant may be used.

The temperature of the reaction is subject to variation depending upon the particular reactants, but generally speaking I can operate in one way of two ways. In carrying out the reaction in one step with a primary amine and phthalic anhydride, I prefer to operate between the temperatures of 30° C. and that temperature at which the phthalamic acid is converted into the phthalimide. If the reaction with a primary amine and an acid anhydride is to be carried out in two steps, I prefer to operate in the range of about 150° C. to about 225° C. In the reaction between a secondary amine and an acid anhydride I prefer to operate at a temperature range of about 150° C. to about 225° C. If desired, higher or lower temperatures may be employed. The reaction may be carried out under atmospheric or superatmospheric pressures.

If the reaction between a primary amine and an acid anhydride is carried out according to the second method, the hydrolysis of the imide may be effected with an aqueous hydrolyzing agent as, for example, an alkali metal hydroxide such as an aqueous solution of sodium hydroxide or potassium hydroxide. If the acid is desired, the final product is further acidified.

The reaction between the amine and the acid anhydride and/or the subsequent hydrolysis may be effected in the presence of a solvent or diluent, e. g., benzene, acetone, mineral spirits, dioxane, toluene, cyclohexane, hexahydro- and decahydronaphthalene.

Inasmuch as the resulting product contains a carboxyl group, it is capable of forming salts by the addition of inorganic bases, e. g., potassium carbonate, sodium hydroxide, potassium hydroxide, calcium hydroxide, and the like.

The invention provides new and useful water-resistant, low-vapor pressure plasticizers for cellulose derivatives. The alkali metal or amine salts of the long chain compounds show advantageous wetting and detergent properties.

The phthalamates of the long chain amines in particular are very useful. Among their specific uses may be mentioned their use as plasticizers in conjunction with cellulose derivatives such as cellulose nitrate, ethyl cellulose or cellulose acetate, in the preparation of lacquers and enamels for coating wood, metal, fabrics, cloth, paper and wire screens, in dopes for coating fabrics, in moisture-proofing lacquers for coating regenerated cellulose and related substances, and in plastic compositions used for the manufacture of toiletware, sheeting, rods, tubes and dentures. Due to the non-volatile nature of these compounds, films of cellulose derivatives containing them are substantially permanently flexible and have good durability.

The phthalimides of long chain amines which are intermediates in the preparation of phthalamates may be isolated and are useful as plasticizers for cellulose derivatives. In moisture-proofing lacquers for regenerated cellulose, the phthalimides yield a product of good appearance which possesses favorable moisture-proofing characteristics.

In the form of their alkali metal or amine salts the phthalamates of long chain amines may be used as wetting agents, detergents, mercerizing assistants, emulsifying agents, pigment dispersing agents, flotation agents, insecticide spreaders, and for similar purposes where surface active materials are desired.

As many apparently widely different embodiments of this invention may be made without departing from the spirit and scope thereof, it is to be understood that I do not limit myself to the specific embodiments thereof except as defined in the appended claims.

I claim:

1. Compounds having the general formula

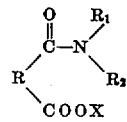

wherein X is a member of the group consisting of hydrogen, alkali metals and alkaline earth metals, R represents the residue of a dicarboxylic acid, $R_1$ is an aliphatic hydrocarbon radical containing at least eight carbon atoms, and $R_2$ is a member of the class consisting of hydrogen and alkyl radicals.

2. Compounds having the general formula

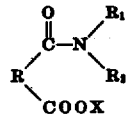

wherein X is a member of the group consisting of hydrogen, alkali metals and alkaline earth metals, R is an ortho-aromatic radical of the benzene series, $R_1$ is an aliphatic hydrocarbon radical containing at least eight carbon atoms, and $R_2$ is a member of the class consisting of hydrogen and alkyl radicals.

3. Compounds having the general formula

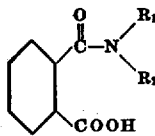

in which $R_1$ represents an aliphatic hydrocarbon radical containing at least eight carbon atoms, and $R_2$ is a member of the class consisting of hydrogen and alkyl radicals.

4. Compounds having the general formula

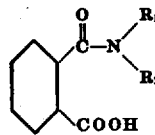

in which $R_1$ represents an aliphatic hydrocarbon radical containing eight to eighteen carbon atoms, and $R_2$ is a member of the class consisting of hydrogen and alkyl radicals.

5. In a process of producing compounds having the general formula

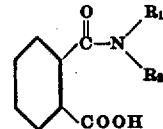

in which $R_1$ represents an aliphatic hydrocarbon radical containing at least eight carbon atoms, and $R_2$ is a member of the class consisting of hydrogen and alkyl radicals, the step which comprises reacting an anhydride of a dicarboxylic acid with a long chain aliphatic amine containing at least eight carbon atoms and having at least one hydrogen atom on the amino-nitrogen.

6. The process which comprises reacting, by heating, phthalic anhydride with an aliphatic amine containing an alkyl radical of at least eight carbon atoms.

7. The process which comprises reacting, by heating, phthalic anhydride with a primary aliphatic amine containing at least eight carbon atoms, and treating the resultant product with a hydrolyzing agent.

8. The process which comprises reacting, by heating, phthalic anhydride with a long chain aliphatic secondary amine containing an alkyl radical of at least eight carbon atoms.

9. The process which comprises reacting, by heating, phthalic anhydride with a long chain aliphatic amine containing an alkyl radical of at least eight carbon atoms and having at least one hydrogen atom on the amino-nitrogen at a temperature within the range of about 150° C. to about 225° C.

PAUL L. SALZBERG.

DISCLAIMER 2,101,323.—*Paul L. Salzberg*, Wilmington, Del. MONOAMIDES OF DICARBOXYLIC ACIDS AND PROCESS OF PREPARING THE SAME. Patent dated Dec. 7, 1937. Disclaimer filed Jan. 8, 1946, by the assignee, *E. I. du Pont de Nemours and Company.*

Hereby enters this disclaimer to claims 1 and 5 in the specification.

[*Official Gazette February 12, 1946.*]

hydrogen, alkali metals and alkaline earth metals, R represents the residue of a dicarboxylic acid, $R_1$ is an aliphatic hydrocarbon radical containing at least eight carbon atoms, and $R_2$ is a member of the class consisting of hydrogen and alkyl radicals.

2. Compounds having the general formula

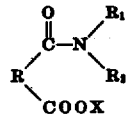

wherein X is a member of the group consisting of hydrogen, alkali metals and alkaline earth metals, R is an ortho-aromatic radical of the benzene series, $R_1$ is an aliphatic hydrocarbon radical containing at least eight carbon atoms, and $R_2$ is a member of the class consisting of hydrogen and alkyl radicals.

3. Compounds having the general formula

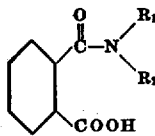

in which $R_1$ represents an aliphatic hydrocarbon radical containing at least eight carbon atoms, and $R_2$ is a member of the class consisting of hydrogen and alkyl radicals.

4. Compounds having the general formula

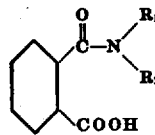

in which $R_1$ represents an aliphatic hydrocarbon radical containing eight to eighteen carbon atoms, and $R_2$ is a member of the class consisting of hydrogen and alkyl radicals.

5. In a process of producing compounds having the general formula

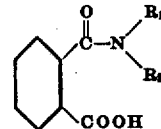

in which $R_1$ represents an aliphatic hydrocarbon radical containing at least eight carbon atoms, and $R_2$ is a member of the class consisting of hydrogen and alkyl radicals, the step which comprises reacting an anhydride of a dicarboxylic acid with a long chain aliphatic amine containing at least eight carbon atoms and having at least one hydrogen atom on the amino-nitrogen.

6. The process which comprises reacting, by heating, phthalic anhydride with an aliphatic amine containing an alkyl radical of at least eight carbon atoms.

7. The process which comprises reacting, by heating, phthalic anhydride with a primary aliphatic amine containing at least eight carbon atoms, and treating the resultant product with a hydrolyzing agent.

8. The process which comprises reacting, by heating, phthalic anhydride with a long chain aliphatic secondary amine containing an alkyl radical of at least eight carbon atoms.

9. The process which comprises reacting, by heating, phthalic anhydride with a long chain aliphatic amine containing an alkyl radical of at least eight carbon atoms and having at least one hydrogen atom on the amino-nitrogen at a temperature within the range of about 150° C. to about 225° C.

PAUL L. SALZBERG.

DISCLAIMER 2,101,323.—*Paul L. Salzberg*, Wilmington, Del. MONOAMIDES OF DICARBOXYLIC ACIDS AND PROCESS OF PREPARING THE SAME. Patent dated Dec. 7, 1937. Disclaimer filed Jan. 8, 1946, by the assignee, *E. I. du Pont de Nemours and Company.*

Hereby enters this disclaimer to claims 1 and 5 in the specification.

[*Official Gazette February 12, 1946.*]

DISCLAIMER

2,101,323.—*Paul L. Salzberg*, Wilmington, Del. MONOAMIDES OF DICARBOXYLIC ACIDS AND PROCESS OF PREPARING THE SAME. Patent dated Dec. 7, 1937. Disclaimer filed Jan. 8, 1946, by the assignee, *E. I. du Pont de Nemours and Company.*

Hereby enters this disclaimer to claims 1 and 5 in the specification.

[*Official Gazette February 12, 1946.*]